F. SCHULDER.
SELF CLOSING FAUCET.
APPLICATION FILED FEB. 17, 1917.
1,272,867.
Patented July 16, 1918.
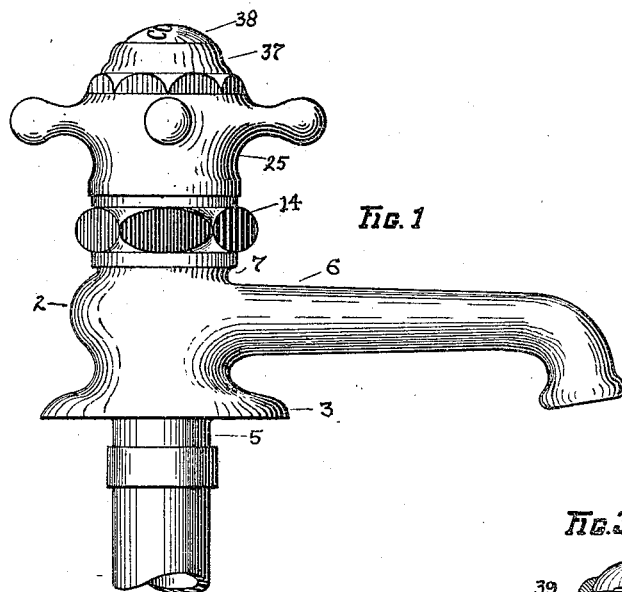
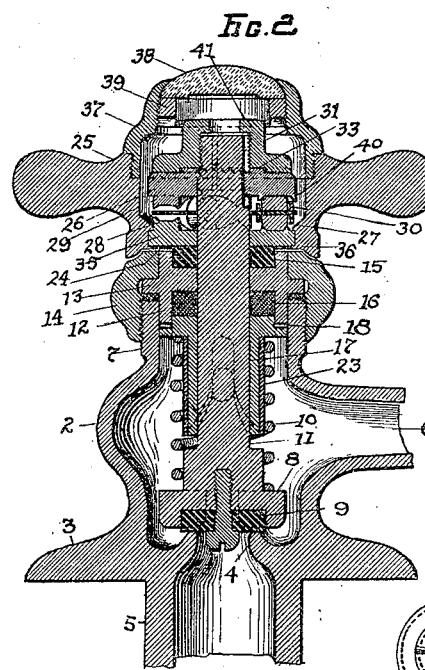
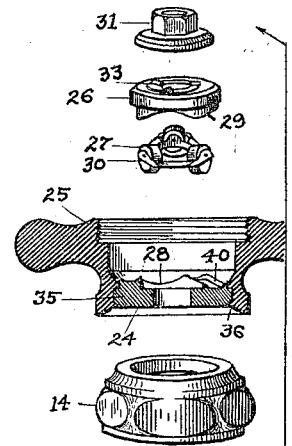
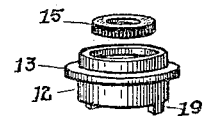
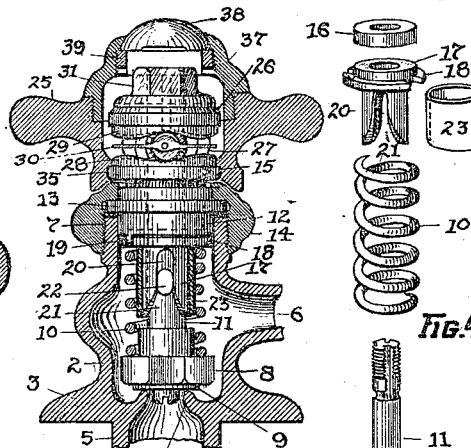
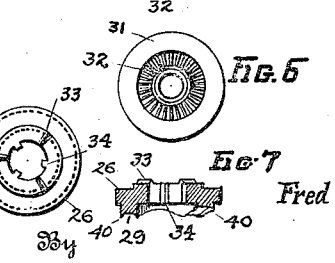
Witness
F. C. Harrold
Inventor
Fred Schulder
By Fisher & Mosert
Attorneys

UNITED STATES PATENT OFFICE.

FRED SCHULDER, OF CLEVELAND, OHIO, ASSIGNOR TO UNITED BRASS MANUFACTURING COMPANY, OF CLEVELAND, OHIO, A COPARTNERSHIP COMPOSED OF WM. J. SCHOENBERGER AND BENJAMIN F. KLEIN.

SELF-CLOSING FAUCET.

1,272,867.  Specification of Letters Patent.  Patented July 16, 1918.

Application filed February 17, 1917. Serial No. 149,156.

*To all whom it may concern:*

Be it known that I, FRED SCHULDER, citizen of the United States, residing at Cleveland, in the county of Cuyahoga and State of Ohio, have invented certain new and useful Improvements in Self-Closing Faucets, of which the following is a specification.

My invention appertains to self-closing faucets, and comprises an improved organization of parts substantially as herein shown and described and more particularly pointed out in the claims.

In general, my conception is to produce a self-closing valve of symmetrical proportion in which the working parts are compactly assembled, readily disassembled, and adapted to co-act with the highest efficiency and a minimum of wear, while easily adjusted to take up wear. The idea of means involves the use of cams and rollers and a rotatable handle to effect uplift of a separate valve stem without rotation of said stem or uplift of the handle relatively to the body, and also involves the employment of a handle having an inset ring of good wearing material affixed thereto and adapted to afford a rotatable bearing surface at the bottom of the handle and a cam surface within the handle to seat the rollers. Other features of novelty and utility are embodied in the specific mode of supporting and securing the valve stem and handle in operable position within and upon the faucet body, in the means for fastening the index member as a crown upon the handle, and in other details of construction as hereinafter more particularly described.

In the accompanying drawings, Figure 1 is a side view, substantially full size, of a faucet embodying my improvements. Fig. 2 is a view in section taken on a vertical line centrally through the faucet, but enlarged as compared with the actual size of the faucet. Fig. 3 is a view showing the faucet body and handle in section and the internal parts in side elevation, the view being substantially actual size and the spout and supply portions of the body being broken away. Fig. 4 represents in perspective the separate valve confining and operating elements in the relative order in which they are surmounted within and upon the body and each other. Fig. 5 is a sectional view of the locking nut, and Fig. 6 is a bottom view of the serrated face thereof. Fig. 7 is a sectional view of the upper cam member, and Fig. 8 a top plan view thereof.

The body 2 of the faucet may be of any preferred shape or style, but as shown it embodies a flanged base 3 having a central valve seat 4 therein open to a tubular extension 5 at its bottom through which the liquid is adapted to flow upwardly. Outflow is through the spout 6 at one side of the chambered body 2, and an open neck 7 of smooth interior and screw-threaded upon its exterior projects above the body in axial alinement with the valve seat and is adapted to receive and support the valve operating parts. That is to say, a valve member 8 having a fiber or rubber disk 9 affixed to its bottom is adapted to rest upon the valve seat under the pressure of a strong coiled spring 10 sleeved upon the valve stem 11 which is supported for slidable movement centrally within the body by a packing ring 12 having an annular flange 13 clamped tightly upon the upper end face or edge of neck 7 by a union nut 14. Ring 12 is recessed at its top to hold a washer 15 of fiber, metal or other suitable material and is also recessed at its bottom to hold compressible packing material 16 which is engaged by a tubular gland or follower 17 sleeved upon the valve stem and pressed upwardly by spring 10. The circular edge 18 of follower 17 is notched at one or more places to receive one or more short lugs 19 projecting downward from ring 12, and the follower is also provided with one or more slots or channels 20 with flaring entrances 21 at the bottom end thereof, whereby one or more lateral projections on the valve stem may be introduced and have slidable movement in the slots or channels. The projections 22 prevent the stem from turning independently of the follower and ring, and all of these parts are prevented from rotating together when the union nut 14 is screwed tightly in place. The divided portion of follower 17 is preferably reinforced by a metal band or ferrule 23 having a press fit thereon.

The length of the valve stem is such that it extends a short distance above washer 15 in ring 12, and the top face of this washer is flat and smooth to serve as a bearing and seat for a similar flat smooth surface 24 at the bottom of the chambered handle 25. In this way the handle is permitted to rotate freely in true squared alinement with the valve stem without tilt or upward movement whatsoever and with a permanently closed and sanitary joint. Thus, when the parts are adjusted properly spring 10 is under constant tension to press the handle downwardly upon the washer through the medium of an annular disk 26 slidably keyed upon the upper screw-threaded and channeled extremity of the valve stem, which disk rests upon a series of radially related rollers 27 adapted to ride upon an annular undulating way or track 28 formed in the top face of the bottom of the chambered handle. Annular disk 26 is also formed with a corresponding annular undulating way or track 29 at its bottom adapted to ride upon the rollers which revolve on trunnions or shafts carried by a ring separator 30 of any suitable construction, and the disk is locked in place by a flanged nut 31 in screw-threaded engagement with the valve stem. The nut is in turn locked in place by radial serrations or teeth 32 retired within a raised border at its bottom and engaged with a plurality of radial teeth 33 in the raised top face of disk 26 which is keyed to the stem by one or more inwardly-extending projections 34, see Figs. 5 to 8. The handle and stem being operatively secured together as described, rotation of the handle in either direction will cause uplift of the stem and raise the valve from its seat, the rollers and undulating surfaces co-acting to bring about this result. Obviously, the wear centers upon the rollers and undulating surfaces, and where the handle is made of cast brass or a similar alloy as commonly practised the greatest wear occurs in the undulating way in that member. To obviate this, I provide the handle with an inset member 35 of different metal of good wearing quality in the form of an annular disk corresponding to disk 26, and as shown the undulating way 28 and the flat seating surface 24 for handle 25 are both embodied in this inset member. In producing this composite handle, an annular seat is formed within the lower end of the round handle body and the member forced therein and finally securely fixed in place in a suitable manner, for example by developing inwardly-turned lips or an annular flange 36 from the stock in the handle body at the outer circular edge of the member. The upper end of the handle is in the shape of a round opening bordered by an internal screw-thread to receive the screw-threaded flange of an index holder and cap 37. The index member 38, usually, but not necessarily made of vitreous material, is removably fastened within the internally screw-threaded open upper end of holder 37 by a screw-ring 39, the diameter of the ring being large enough to permit nut 31 to move upwardly therein within the limit of uplift of the valve stem. In fact, all the parts carried by the stem within the handle must have like freedom of action because the handle merely rotates upon its bottom 24 and does not rise nor fall with the valve stem as in the usual type of self-closing faucets known to me.

Also, the cam disk 26 and inset member 35 are preferably stamped or pressed products and the undulating way on each is preferably bordered by beveled flanges 40 of relatively low height (see Fig. 7) to guide the rollers in their circular travel. The parts are secured together in operative relation by a nut 31, and to prevent the nut from being screwed downward upon the valve stem in excess of needed requirements, the nut is formed with an inwardly-extending flange or lip 41 adapted to engage the upper end of the stem.

What I claim is:

1. In a self-closing faucet, a rotatable non-rising handle provided with a member having an undulating upper surface, a valve having a stem provided with a member having an undulating bottom surface, rolling members interposed between said surfaces, and a tension device to seat said valve.

2. In a self-closing faucet, a body and valve therein having a stem; a rotatable handle, supported in non-rising position upon said body, having a bottom bearing surface and an annular undulating upper surface; rolling members seated upon the undulating upper surface of said handle; an annular disk removably affixed upon said stem having an undulating bottom adapted to seat upon said rolling members; and a tension device to seat said valve.

3. In a self-closing faucet, a passaged body having a valve seat, a valve having a stem, a tension device to seat said valve, a hollow handle supported in rotatable non-rising position upon said body and sleeved upon said stem and having an annular undulating surface internally, a disk removably secured upon said stem internally of said handle and having an annular undulating bottom surface, rolling members seated upon the undulating surface of said handle beneath said disk, and a removable cap for said hollow handle.

4. In a self-closing faucet, a valve having a stem provided with a disk having an annular undulating surface, a chambered body having a seat for said valve, a handle for said stem having a ring of hardened metal affixed thereto, said ring having annular undulating surfaces, rolling members interposed between the undulating surfaces of said disk and ring, respectively, and tension means to seat said valve.

5. In a self-closing faucet, a rotatable valve-operating handle having a ring of hard metal affixed in its bottom, said ring having a flat smooth bottom and an annular undulating surface on the upper side thereof.

6. In a self-closing faucet, a hollow rotatable valve-operating handle having an independent ring made of good wearing metal forming a bottom therein, the bottom surface of said ring providing a rotatable bearing for said handle, and the top surface of said ring being undulating to seat a series of rolling members.

7. In a self-closing faucet, a hollow handle having a separate member of good wearing metal affixed therein and formed with a smooth bearing surface exposed outside of the handle and an annular undulating surface internally of the handle.

8. In a self-closing faucet, a chambered body having a valve seat, a valve having a stem, a spring to seat said valve, a rotatable handle and means to lift said stem and valve, and a packing ring for said stem secured upon said body and having a flat washer confined within its top and providing a seat for said rotatable handle.

9. In a self-closing faucet, a body having a water passage and a valve seat, a spring pressed valve having a stem, a packing ring to support said stem, a union nut to secure said ring upon the body, and a flat washer in the top face of said ring, in combination with a hollow rotatable handle having a flat smooth bottom seated upon said washer, and means internally of said handle to raise said stem without a rising movement of the handle.

10. In a self-closing faucet, a body having a water passage and a valve seat, a valve having a stem, a packing ring supporting said stem, a slotted follower member sleeved upon said stem and slidably interlocked with both said ring and said stem, and a union nut to lock said ring and associated parts in non-rotating position upon said body, in combination with a rotatable handle and means to raise said stem and valve.

11. In a self-closing faucet, a body having a water passage and a valve seat, a valve having a stem provided with a lateral projection, a packing ring to support said stem, a slotted follower sleeve slidably engaging said projection and slidably interlocked with said ring, a coiled spring interposed between said valve and ring, and a union nut to secure said ring upon the body, in combination with a handle and means to raise said stem and valve.

12. In a self-closing faucet, a body having a valve seat, a valve having a stem provided with projections, a packing ring supporting said stem having depending lugs, a follower having notches to receive said lugs and provided with open slots at one end thereof to receive said stem projections, a coiled spring sleeved about said stem and follower and engaged with said valve and follower at its opposite ends, and a union nut to fasten said ring upon said body.

13. In a self-closing faucet, a valve having a stem, a cam disk slidably keyed to said stem having radial teeth on its top face, and a serrated nut in screw engagement with said stem and adapted to interlock with said teeth.

14. In a self-closing faucet, a valve having a screw-threaded stem, an annular disk slidably keyed to said stem having an undulating way at its bottom face and radial teeth in its top face and a flanged nut having radial serrations in its bottom face adapted to engage said teeth and screw threads internally to engage said stem.

15. In a self-closing faucet, a valve having a screw-threaded stem, a cam disk mounted on said stem having an annular raised top portion centrally thereof provided with radial teeth, and a screw nut engaged with said stem having radial serrations retired within a raised annular border at its bottom adapted to seat upon the top face of said disk.

16. In a self-closing faucet, a hollow handle having a bottom provided with a central opening and an undulating way in the top face of said bottom annularly about said opening and an open upper end encircled by a screw-threaded rim, and a screw-threaded cap to close the open end of said handle.

17. In a self-closing faucet, a chambered handle having a base portion provided with an undulating way in the top face thereof and having further an open upper screw-threaded end, and a screw-threaded index holder and cap removably engaged with said screw-threaded end having a removable index member centrally within its top and provided with a screw ring internally to fasten said member in place.

Signed at Cleveland, in the county of Cuyahoga and State of Ohio, this 9th day of February, 1917.

FRED SCHULDER.

Copies of this patent may be obtained for five cents each, by addressing the "Commissioner of Patents, Washington, D. C."